United States Patent [19]
Jäger

[11] Patent Number: 6,147,746
[45] Date of Patent: Nov. 14, 2000

[54] PROCESS FOR OPTICAL MEASUREMENT OF RELATIVE ANGLES

[75] Inventor: Heinz Jäger, Volketswil, Switzerland

[73] Assignee: J. Muller AG, Switzerland

[21] Appl. No.: 09/142,919

[22] PCT Filed: Mar. 17, 1997

[86] PCT No.: PCT/CH97/00111

§ 371 Date: Apr. 8, 1999

§ 102(e) Date: Apr. 8, 1999

[87] PCT Pub. No.: WO97/35211

PCT Pub. Date: Sep. 25, 1997

[30] Foreign Application Priority Data

Mar. 20, 1996 [EP] European Pat. Off. .............. 96104405

[51] Int. Cl.$^7$ .............................. G01C 3/00; G01B 11/26
[52] U.S. Cl. ...................................... 356/3.09; 356/141.4
[58] Field of Search .................................. 356/3.09, 141.4

[56] References Cited

U.S. PATENT DOCUMENTS

| | | | |
|---|---|---|---|
| 2,830,487 | 4/1958 | Griffith | 356/3.09 |
| 3,714,657 | 1/1973 | Lapeyre | 356/3.09 |
| 4,268,167 | 5/1981 | Alderman | 356/3.09 |
| 4,486,095 | 12/1984 | Mitchelson | 356/141.4 |
| 4,895,440 | 1/1990 | Cain et al. | 356/141.4 |
| 4,911,548 | 3/1990 | Keren-Gill | 356/3.09 |
| 5,110,202 | 5/1992 | Dornbusch et al. | 356/3.09 |

OTHER PUBLICATIONS

International Publication No. WO 94/00778 dated Jan. 6, 1994.

*Primary Examiner*—Stephen C. Buczinski
*Attorney, Agent, or Firm*—Dykema Gossett PLLC

[57] ABSTRACT

To calculate the distance and angle of a measuring platform with respect to reference marks, fans of light are emitted from the measuring platform by light emitters. The light emitters are therefore arranged on a circular path about the central axis to rotate in such a manner that the fans of light are emitted tangentially to the circular path. The distance and the angle can be calculated on the basis of the angle of the reflected fans of light received on the measuring platform by the trigonometric method. This arrangement according to the invention results in precise measurements of the distance and the angle in one circular passage of the light emitter, even when the measuring platform is moving.

12 Claims, 5 Drawing Sheets

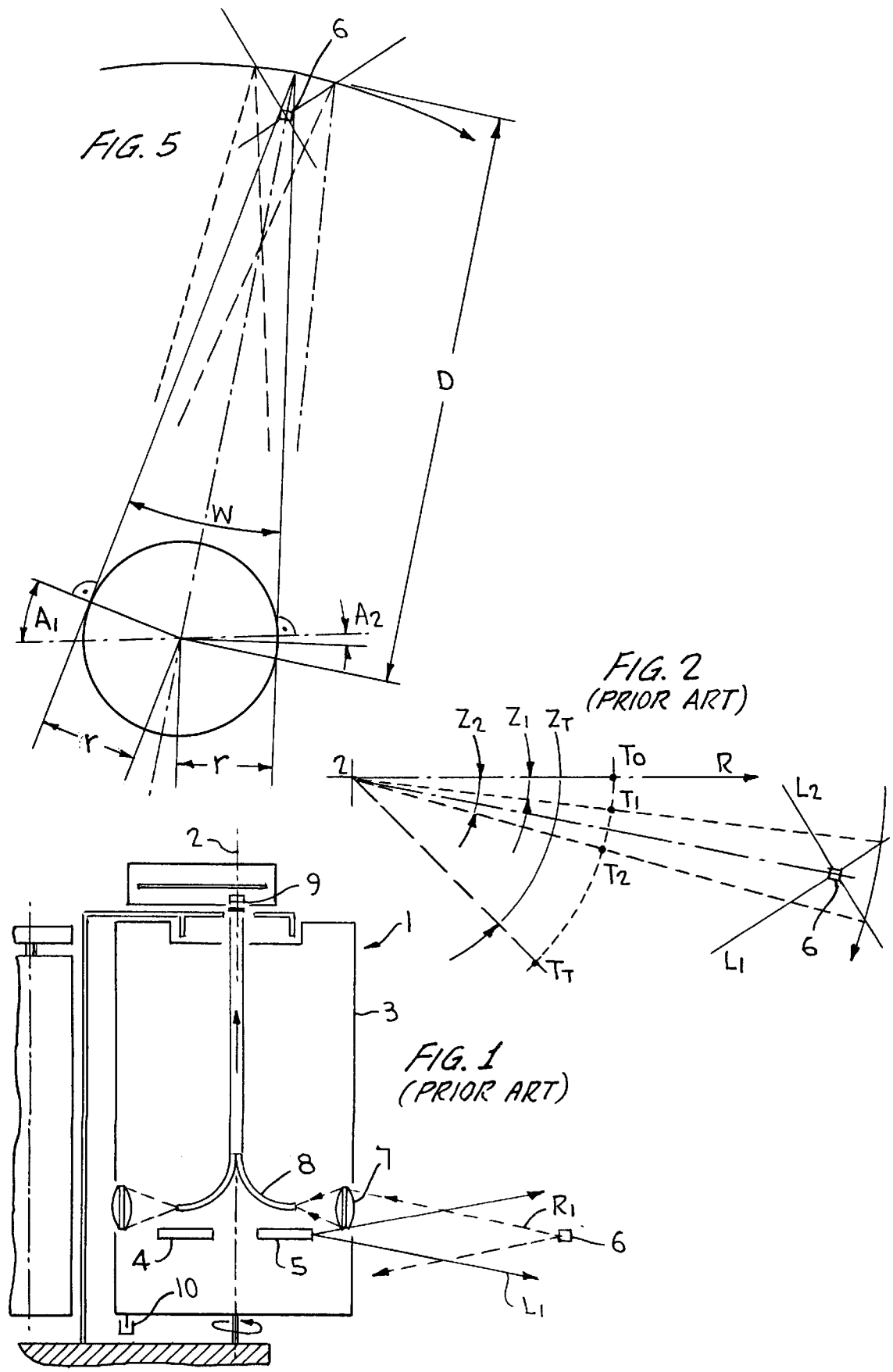

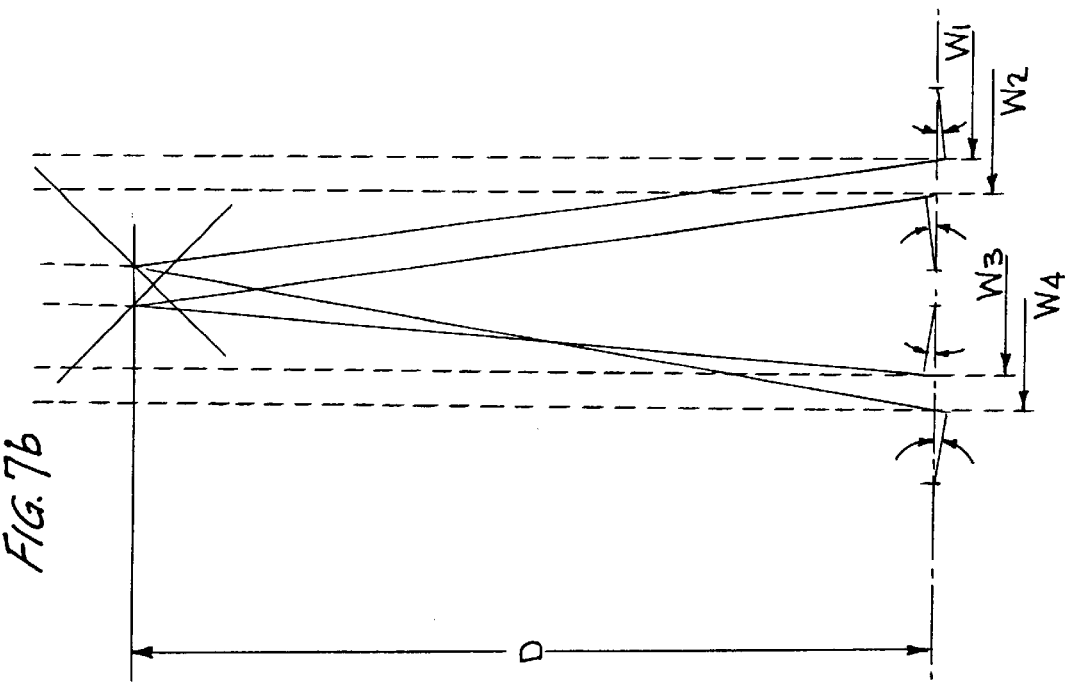
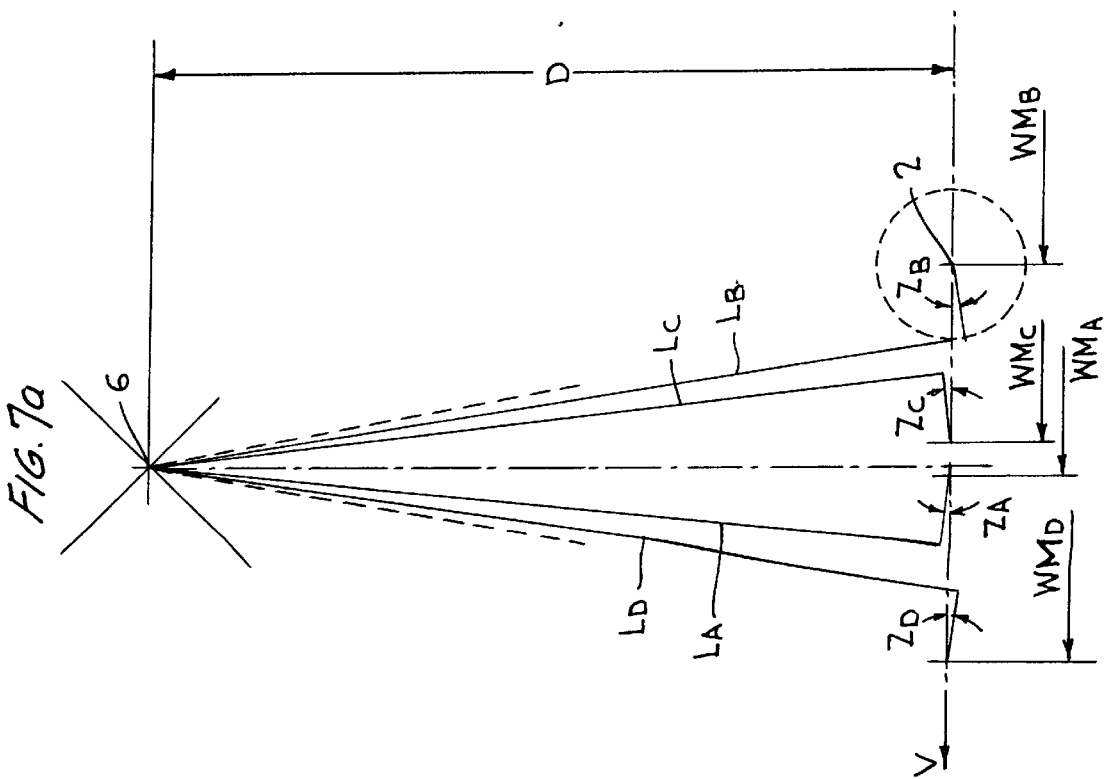
FIG. 7a
FIG. 7b

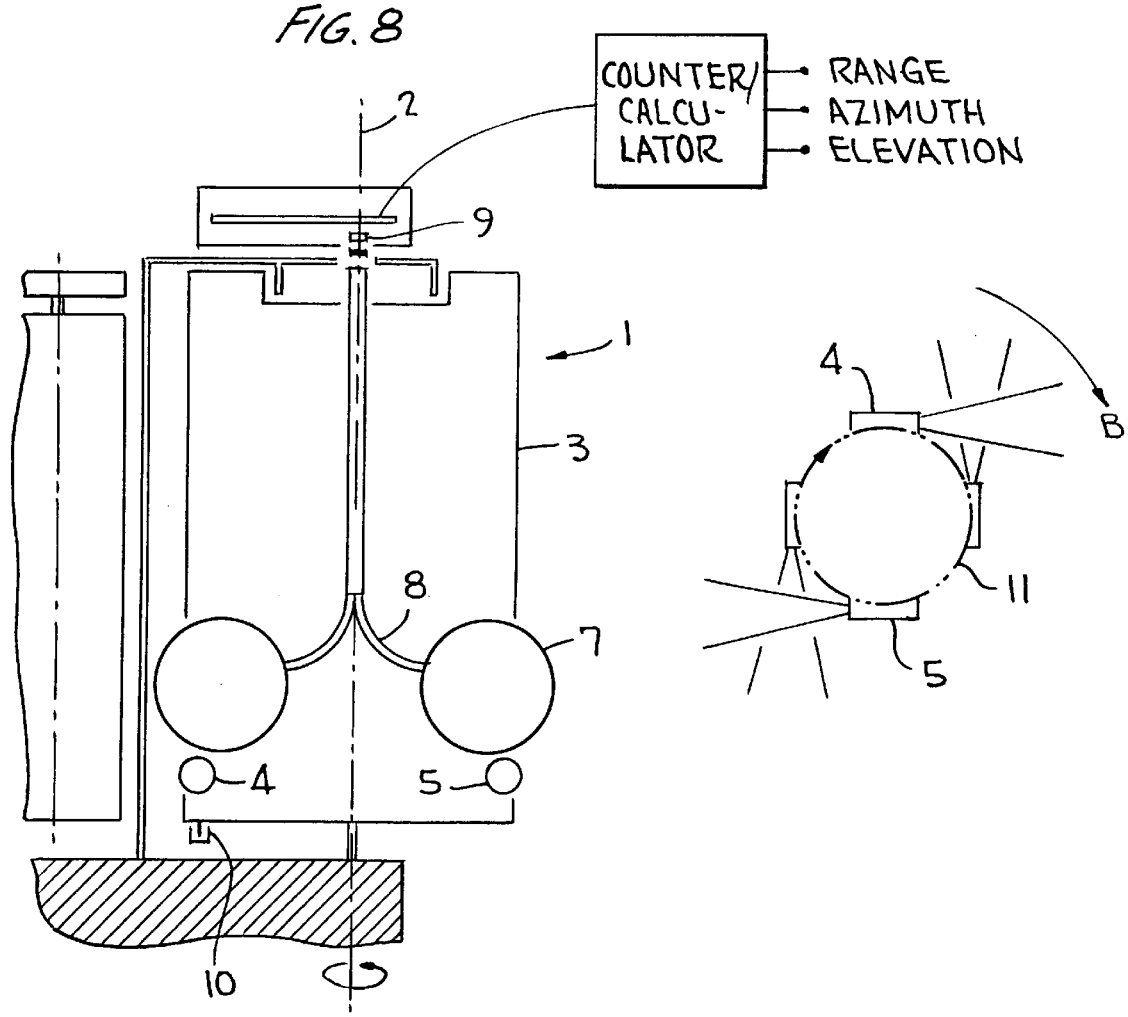

PROCESS FOR OPTICAL MEASUREMENT OF RELATIVE ANGLES

BACKGROUND OF THE INVENTION

The submitted invention provides an optical measuring method to measure relative angles between a measuring device and a measuring point by using a band of fanned beams which are emitted from the measuring device and said beams are being thrown back by reflectors installed at the measuring points, whereby the emitting light beam is rotated around the axis of the measuring device, and said light beam passes a predetermined angle range at the beginung in relation to the measuring device, said angle being measured by counting clock pulses until said light beam has reached the end of the angle range, and whereby the determined counter readings are recorded, said counter readings are obtained by a reflected light beam thrown back and the relative angles are calculated by interpretation of the ratio of the counter readings, and furthermore there is included a measuring device to implement said optical measuring method.

A similar method has been noted in patent registration WO 94/00778, U.S. Pat. No. 5,587,787. Said patent relates to a method to measure angles between a measuring platform and a measuring point, whereby a fanned light beam in a level band is rotated around the vertical axis of said measuring platform and where said light beam is thrown back to the measuring platform by reflectors instaled at the measuring points. There is a counter device on the measurig platform which begins to count pulses of the passing fanned light beam at a defined starting position and which registers counter readings when receiving a reflecting light beam. The relative angle between the reflector and the starting position of the measuring platform can be computed by using the ratio of counter readings.

It has been noticed, however, that the accuracy of this method does not meet necessary requirements by using various ratios of the measuring platform especially in relation to the reflectors and moving measuring platform. It is also not possible to calculate the direct distance between measuring platform and reflectors with known methods and devices. This is only possible with separate measuring means.

SUMMARY OF THE INVENTION

The task of the submitted invention was to improve the known methods to such a degree that, on one side, direct distance measuring is possible and, on the other side, the accuracy of measuring results is increased even for continuously changing conditions of the measuring platform, especially in regard to the moving speed of the measuing platform in relation to the reflectors.

This task is resolved in accordance with the invention defined in claim1.

Other preferred applications using the measuring device are described in related claims 7 to 10.

The placement of a light source with a tangential light beam in relation to a concentric orbit that circles a rotating axis, instead of the radial placement of a light beam in relation to the rotating axis, makes possible direct distance measuring to the reference marks. In addition, the placement of several light sources adds to the increase of accuracy since angle and distance can me measured by using several readings.

According to the invention, said placement of a light source allows also easy installation of the light source and light receptor within the measuring device housing, since they will no longer have to be installed in the center of said housing.

In accordance with the invention, the measuring method and the measuring device is particularly practical for taking measurements from moving platforms, as for example from railroad cars.

BRIEF DESCRIPTION OF THE DRAWINGS

Application examples of the invention are described in the attached drawings. They show the following:

Drawing #1 (FIG. 1) Axial section view of a conventional measuring device.

Drawing #2 (FIG. 2) Diagram of measuring procedures using a conventional method.

Figure 3:
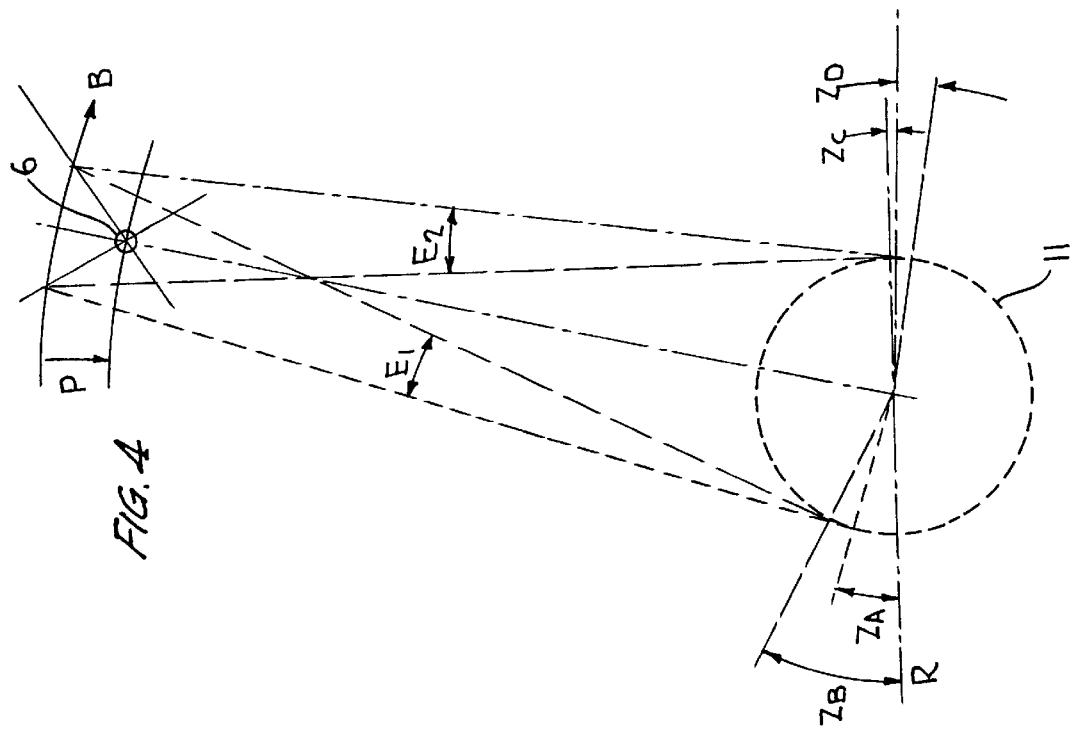

Drawing #3 (FIG. 3) Diagram of measuring azimuth according to the invention.

Figure 4:
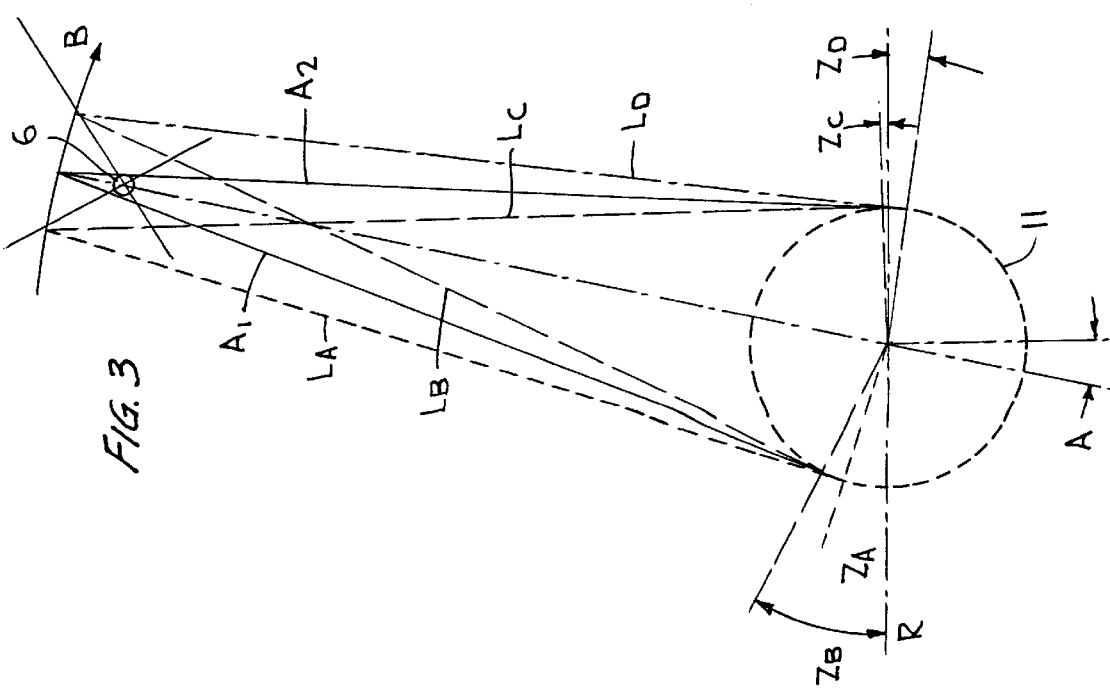
Figure 6A:
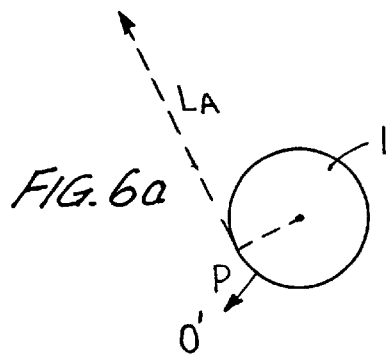
Figure 6B:
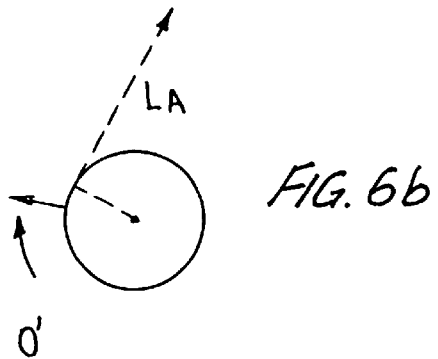
Figure 6C:
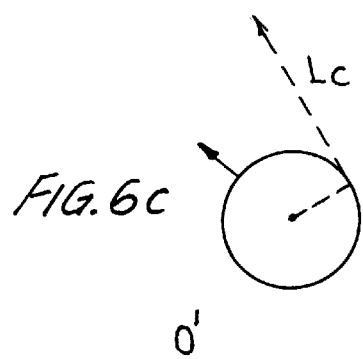
Figure 6D:
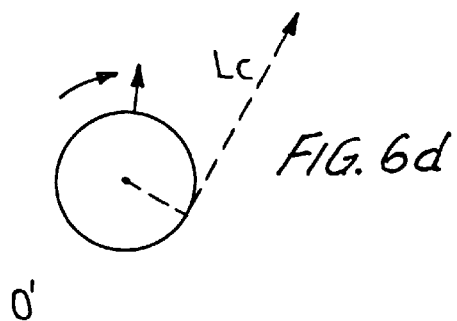
Figure 6E:
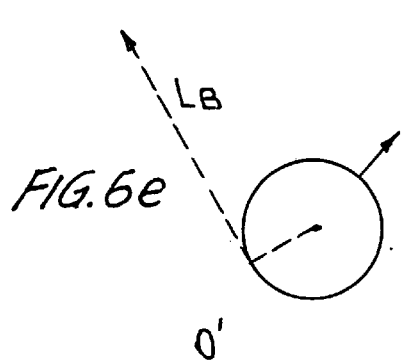
Figure 6F:
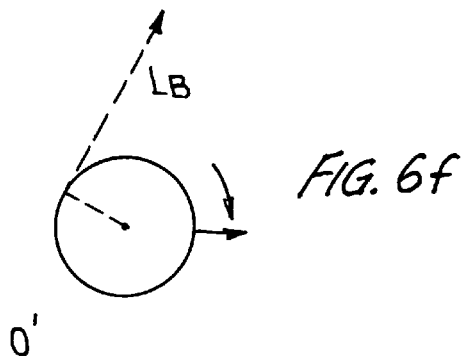
Figure 6G:
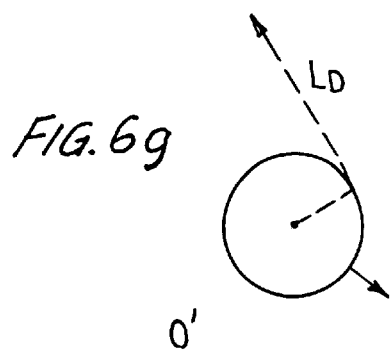
Figure 6H:
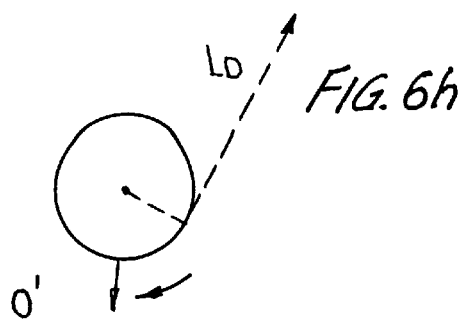

Drawing #4 (FIG. 4) Diagram of measuring elevation according to the invention.

Drawing #5 (FIG. 5) Diagram of measuring distances according to the invention.

Drawing #6 (FIG. 6) Diagram of a light source angle range according to the invention.

Drawing #7 (FIG. 7) Diagram taking into consideration movement of measuring device during measuring of angles and distances.

FIG. 8 Shows an elevation of the present invention shown in cross section and illustrating the orientation of the light sources of the invention.

DETAILED DESCRIPTION OF THE INVENTION

Drawing #1 (FIG. 1) shows a conventional measuring device1 for optical measuring of relative angles between said device and distant 8'. In the cylindrical rotating housing, which rotates around a vertical axis, there are two light sources 4,5 that are placed in a radial perpendicular fashion in relation to the vertical axis 2. Said light sources 4,5 emit fanned light beams $L_1$ on a plane and radial in relation to the vertical axis. When such a light beam $L_1$ reaches a reflector defining reference mark 6, then said light beam is thrown back as a reflecting beam $R_1$, which is then picked up by a light-sensitive sensor 9 after passing through a lens 7 and fiber optics 8.

The light fans ($L_{1,2}$) are preferably fanned in a 45° degree angle in relation to the horizontal plane, whereby the two light fans are placed perpendicular to one another. Said light fans are produced by the light sources 4 and 5.

Relative angles between the measuring device and the reference marks can now be calculated with such an apparatus, as shown schematically in drawing #2. With each turn of the housing 2 a counter will be set on zero at a certain position $T_0$ and then the counter will count at a certain clock pulse.

The counter is started by an electric/optical contact 10 within the housing 3 of the measuring device. As soon as the sensor 9 receives a reflected signal, for example during passing of the light fan $L_1$ onto the reflector defining reference mark 6, then the corresponding counter reading $T_1$ is recorded. The same occurs during the passing of the second light fan $L_2$, whereby the counter reading is recorded as $T_T$. Based on these values, relative angles $Z_{1,2}$ in relation to the defined reference direction R can be calculated simply by the relationship of counter reading $T_{1,2}$ to the counter reading $T_T$. This calculation has the advantage of being independent from rotation speed, which means that variations in the rotating speed is automatically compensated. The use of two light fans $L_1$, which are placed in a certain direction to one another (in this example 90°) allows the calculation of both solid angles of elevation and azimuth in relation to light sources 4,5 and lens 7. In drawing #2 (FIG. 2) both light fans $L_{1,2}$ are shown as perpendicular lines being on top of one another and passing onto reflector defining reference mark 6. The dotted lines, which originate from the center 2, represent angle readings through which light signals $L_{1,2}$ are reflected from reflector defining reference mark 6. In the shown example, reflector defining reference mark 6 is located slightly below the perpendicular plane in relation to rotation axis 2. The example also shows how the light sources are placed. A detailed description of this calculation process is shown at the beginning of publication WO 94/0078, U.S. Pat. No. 5,587,787.

The diagram in drawing #3 (FIG. 3) shows the measuring method and placement of light sources according to the invention. Said drawing shows, for example, the preferred application of using four light sources that are placed symmetrically in a circle 11, whereby light sources close to one another emit light beams and light fans tangential to the circle 11. The light fans $L_{A,B}$ and $L_{C,D}$ are emitted by light sources pointing in the same direction and are preferably placed in an 90° angle to one another. This is shown again in drawing #3 by two perpendicular lines that cross each other at the reflector defining reference mark 6. The arc B with the arrow represents the horizontal plane to which the light sources are pointing.

The dotted lines $L_A$, $L_B$, $L_C$ and $L_D$ represent light fans of the light sources at the moment when the respective light fans are reflected by the reflector defining reference mark 6. The angles and counter readings of said light fans are also shown in their relation to reference line R. In this example, the angles $Z_A$, $Z_B$, $Z_C$ and $Z_D$ are calculated by using the above mentioned method and using the counter readings. To calculate azimuth A, measured from the measuring device 1 to the reflector defining reference mark 6, the mean values of these angles can be obtained as follows:

$$A_1 = \frac{Z_A + Z_B}{2} \quad (1)$$

$$A_2 = \frac{Z_C + Z_D}{2} \quad (2)$$

$$A = \frac{A_1 + A_2}{2} \quad (3)$$

The elevation, which means the measured angle in relation to plane B, the light source and the reflector defining reference mark 6 can be calculated as shown in the schematic drawing #4 (FIG. 4):

$$E_1 = \frac{Z_B - Z_A}{2} \quad (4)$$

$$E_2 = \frac{Z_C - Z_D}{2} \quad (5)$$

$$P = \frac{E_1 + E_2}{2} \quad (6)$$

With this arrangement, according to the invention, it is now easy to perform a calculation for distance, as it is shown in the schematic drawing #5 (FIG. 5). Azimuth data as well as formulas (1) and (2) are being used to perform said calculation. By calculation of the intermediate angle W and by including half the distance 2r of the light sources, the distance D from the measuring device 1 to reference device 6 may be simply calculated as follows:

$$D = \frac{r}{\sin(W/2)}$$

where $W = A_1 - A_2$ and r is ½ of the distance between the light sources.

The apparatus, according to the invention, provides through its applications all necessary data for the calculation of elevation, azimuth and distance.

Said data is preferably calculated and processed only when all four light-reflected signals are being received. This can be done by a simple examination of the data, since the calculated internnediate values for azimuth $A_{1,2}$ and elevation $E_{1,2}$ should practically be the same, and they should show large deviations if one of the reflecting signals is missing.

According to the invention, the light fans $L_A$ through $L_D$, emitting from the light sources, should be only within certain angle ranges, which is also important for the calculation of angle values.

This can be seen, for example, in drawing 6a) to h) where a view of the casing 3 of the measuring device 1 is displayed. The arrow P points in drawing 6a) to the measuring starting point zero. The first light source activates at said starting point, which then emits light fan $L_A$. Thereby, the outgoing beam angle of the light fan $L_A$ in relation to said starting point is firmly defined and may be used for the calculation of angles as described at the beginning. Once a certain angle value has been reached, then the light fan is switched off as shown in drawing 6b). On further rotation, additional light sources of the light fans $L_B$ to $L_D$ are also switched off after reaching certain angle ranges. This is displayed in drawing 6c) to h). Said displayed angle ranges are chosen in such a manner that all four light sources cover the same angle range in relation to the measuring device 1.

It is assumed in the calculation of the displayed drawings and formulas that during the measuring of the four basic values $Z_A$ through $Z_D$ there are no or at least only a slight temporary relative movement between the reflector defining reference mark 6 and the measuring device 1, and therefore the displayed geometry of the circle 11 remains true. This assumption proves to be true even at high rotation speeds of the measuring device 1 and at relative large distances between the measuring device 1 and the reflector defining reference mark 6. However, when this distance is relatively small and there is at the same time a not so neglectable relative movement, then this must be compensated for, according to the invention.

The calculation of such compensation is schematically displayed in drawing #7 (FIG. 7). Drawing #7 (FIG. 7). Drawing 7a) shows the reflecting light fans $L_A$ to $L_D$ reflected by the reflector defining reference mark 6 at points $WM_A$ to $WM_D$ on the rotating axis of the measuring device 1. Points $WM_A$ to $WM_D$ are determined by the central point or more precisely axis 2 of the measuring device. A separate distance measuring apparatus of conventional design measures said points. The distances $W_1$ to $W_4$ are necessary for the calculation of distance D between movement direction V and the reflector defining reference mark 6, which are shown in drawing 7b). Said distances may be calculated by the following known trigonometric methods, whereby the value for $W_1$ is set on zero as reference point:

$$W_1 = 0 \tag{8}$$

$$W_2 = WM_C - WM_B - \frac{R}{\cos Z_C} - \frac{R}{\cos Z_B} \tag{9}$$

$$W_3 = WM_A - WM_B - \frac{R}{\cos Z_A} - \frac{R}{\cos Z_B} \tag{10}$$

$$W_4 = WM_D - WM_B - \frac{R}{\cos Z_D} - \frac{R}{\cos Z_B} \tag{11}$$

Based on above results, distance D may be calculated using the following formulas:

$$D = \frac{W_4}{\sin(Z_D - Z_B)} * \cos Z_B * \cos Z_D \tag{12}$$

$$D = \frac{W_3 - W_2}{\sin(Z_A - Z_C)} * \cos Z_C * \cos Z_A \tag{13}$$

Elevations may be determined by using above results and by using known trigonometric calculations.

It is easy to see that in other applications besides drawing #6, other angles for each light source may be determined, which would be different from the ones shown in drawing #6. If necessary said angles may also be changed or greatly adjusted during running measuring cycles.

It is strongly suggested that the light sources not to be placed only on plane B, but that two or more multilevel planes are to be equipped with light sources.

What is claimed is:

1. An optical measuring device for measuring the range, azimuth and elevation of a distant measuring point comprising:
    a support mounted for rotation about an axis of rotation in a particular direction of rotation;
    four separate sources of fan beams supported in a plane perpendicular to said axis by said support, said sources being equidistantly spaced from said axis, said sources traveling in a circular path when said support is rotated and being equidistantly spaced along said path, said sources defining two pairs of sources with each pair being disposed at diametrically spaced points along said path, one pair of said sources emitting fan beams tangentially to said circular path and in the same direction as said direction of rotation, the other pair of said sources emitting fan beams tangentially to said circular path and in a direction opposite to said direction of rotation, the fan beams of each pair of sources lying in planes perpendicular to one another;
    a receiver adapted to receive reflections of said fan beams produced when said beams impinge on a reflector at a distant measuring point, said receiver adapted to produce signals corresponding to said reflections; and
    counter and evaluation means for evaluating said signals to return the range, azimuth, and elevation of said distant measuring point.

2. An optical measuring device as defined in claim 1 wherein said fan beams each intersect said plane perpendicular to said axis at an oblique anqle.

3. An optical measuring device as defined in claim 2, wherein said oblique angle is 45 degrees.

4. An optical measuring device as defined in claim 1 wherein each fan beam is emitted only within a certain angle of said rotation.

5. An optical measuring device as defined in claim 1, wherein said fan beam sources further comprise laser light sources.

6. An optical measuring device as defined in claim 1, further comprising means for measuring a relative motion of said measuring device and said reflector occurring during a measurement, and compensating for said motion in the determination of said range, azimuth, and elevation.

7. An optical measuring device as defined in claim 1, wherein said evaluation means can evaluate said range, azimuth and elevation during one complete rotation of said support.

8. A method for measuring the range, azimuth and elevation of a distant measuring point comprising:
    providing four separate sources of fan beams with the sources lying in a plane perpendicular to an axis and being equidistantly spaced from said axis;
    moving said sources along a circular path about said axis in a particular direction with the sources being equidistantly spaced from one another along said path, said sources defining two pairs of sources with each pair being disposed at diametrically spaced points along said path;
    emitting fan beams tangentially to said circular path in the same direction as said direction of rotation from one pair of said sources, with the fan beams thereof lying in planes perpendicular to one another;
    emitting fan beams tangentially to said circular path in a direction opposite to said direction of rotation from the other pair of sources with the fan beams thereof lying in planes perpendicular to one another;
    providing a receiver adapted to receive reflections of said fan beams produced when said beams impinge on a reflector at a distant measuring point and produce signals corresponding to said reflections; and
    evaluating said signals to determine the range, azimuth, and elevation of said distant measuring point.

9. A method as defined in claim 8 wherein each of said fan beams defines a plane angled at 45 degrees to a plane containing said circular path.

10. A method as defined in claim 8 wherein each fan beam is emitted only within a certain angle of said motion of said sources along said circular path.

11. A method as defined in claim 8 wherein said fan beams are laser beams.

12. A method as defined in claim 8 comprising the further step of measuring a relative motion of said measuring device and said reflector occurring during a measurement, and compensating for said motion in the determination of said range, azimuth, and elevation.

* * * * *